July 21, 1931. J. P. DAMONTE 1,815,835
WORM GEAR
Filed Aug. 16, 1929
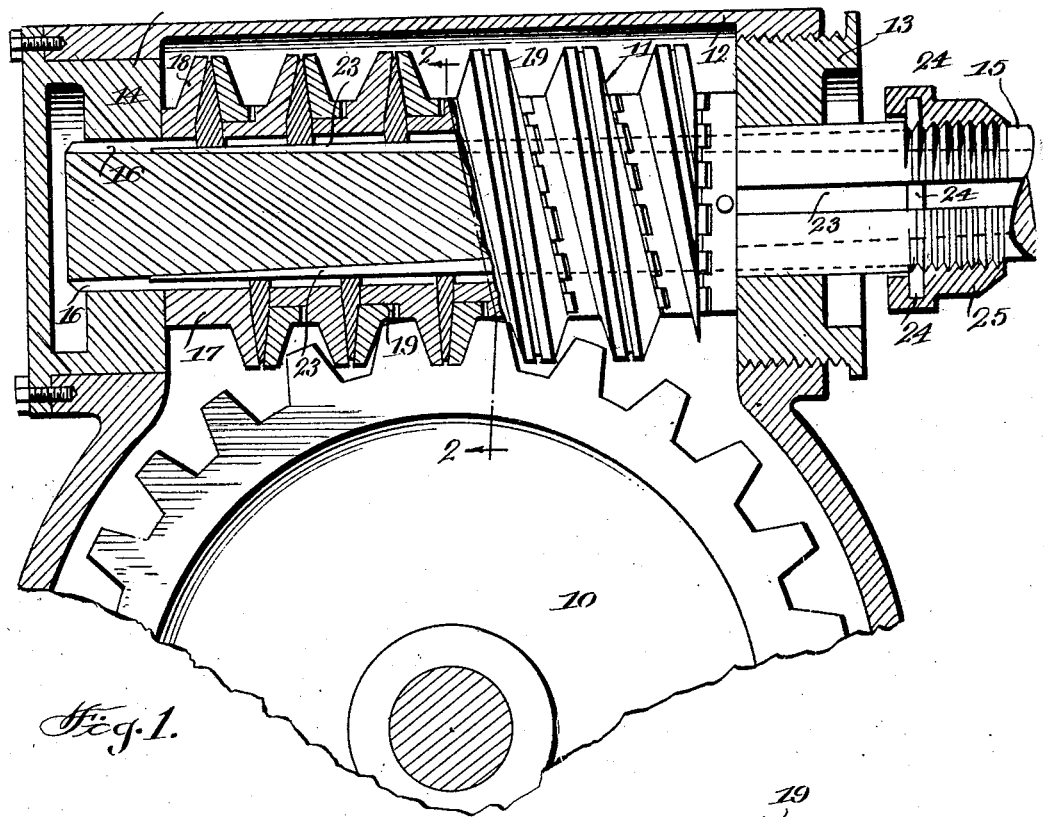
Fig. 1.
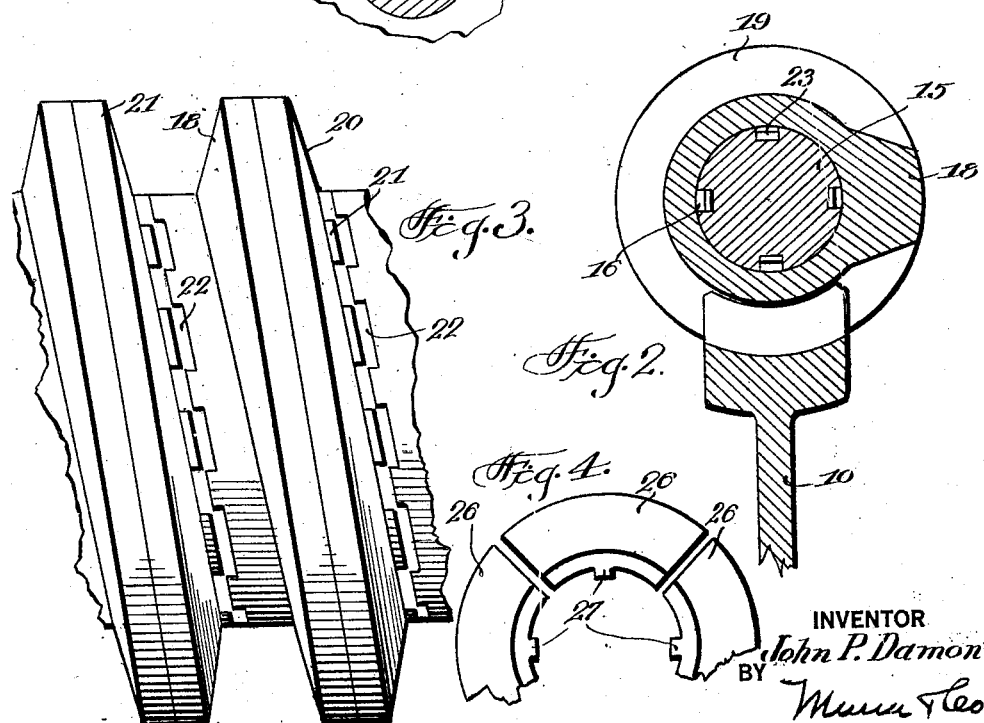
INVENTOR
John P. Damonte
BY
Munn & Co.
ATTORNEY Patented July 21, 1931

1,815,835

UNITED STATES PATENT OFFICE

JOHN P. DAMONTE, OF NEW ORLEANS, LOUISIANA

WORM GEAR

Application filed August 16, 1929. Serial No. 386,268.

This invention relates to improvement in worm gears. As is known worm gears employed for transmitting driving power are subject to considerable wear. If worm gears are continued in use low operating efficiency results. Consequently, worm gears are usually discarded and replaced by new ones.

With the above in view, it is the object of this invention to provide a worm gear construction which can be adjusted to take up wear and thereby enable the gears to be saved as well as obtain a high degree of operating efficiency at all times.

It is also within the objects of the invention that the gear construction be durable and simple in construction.

Other objects relating to details of construction will appear in the detail description to follow:

The invention is illustrated by way of example in the accompanying drawings, in which:

Figure 1 is a longitudinal sectional view through a worm gear of this invention, and also showing the gear in driving relation to a worm wheel;

Figure 2 is a sectional view taken substantially on the line 2—2 of Figure 1;

Figure 3 is a fragmentary perspective view, showing a portion of the worm gear, in partial assembly; and Figure 4 is a detail view, showing the structure of the wedges used in my worm gear construction.

Referring to the drawings more particularly, 10 indicates a worm wheel, 11 a worm gear of the present invention and 12 a housing or casing therefor. The casing 12 carries bearings 13 and 14 for journaling shaft 15, the bearing 13 being adjustable, as shown.

In forming the worm gear I provide the shaft 15 therefor with a plurality of longitudinal grooves 16. I also provide a sleeve 17 adapted for receiving the shaft 16, and having formed therewith a split or one-half spiral thread 18. This construction provides a spiral groove 19 representing the holiday provided by the formation of the split thread 18, and in the groove 19 I fit a second spiral split thread 20. The split thread 20 may be made up of sections if desired. The split thread 20 has axial movement upon the sleeve 17 and is formed with teeth 21 adapted to fit into registering notches 22 formed in the associate edge of the split thread 18.

Each groove 16 has slidable therein a key 23 which tapers gradually toward its one end and its other end is provided with an outwardly turned lug 24. The lugs 24 are disposed within a suitable grove provided in the forward end of an adjusting nut 25 threaded upon the shaft 15 as shown in Fig. 1. Between the split threads 18 and 19 I provide a wedge assembly such as shown in Figure 4. The assembly comprises a plurality of wedges 26, each wedge conforming to the shape of spiral split threads 18 and 19 and tapers toward its outer edge. Each wedge is provided with a lug 27 upon its inner edge adapted to slide within a groove 16 in shaft 15. In other words the lugs 27 rest upon the keys 23 and serve for expanding the thread of the worm gear with inward movement of the keys 23. Similarly, the thread of the worm gear can be made narrower with outward movement of keys 23. As is apparent the position of the keys 23 can be easily adjusted by the nut 25.

As illustrated in Figure 1 the thread of the worm gear 11 can be adjusted to properly fit within the teeth of the worm wheel 10, and thus provide for efficient operation of the worm drive at all times.

While I have shown and described the preferred embodiment of my invention it is to be understood that I am aware that the general arrangement and construction of parts might be changed by those skilled in the art without departing from the spirit of my invention as indicated by the appended claims.

I claim:

1. A worm gear comprising a split thread, and radially movable means for axially expanding said thread.

2. A worm gear comprising a shaft, a split spiral thread thereon, and radially movable wedge means for expanding said thread.

3. A worm gear comprising a shaft, a split spiral thread upon the shaft, radially movable wedges for expanding said thread, and means carried by the shaft for actuating said wedges.

4. A worm gear comprising a shaft, a split spiral thread upon the shaft, wedges for expanding said thread, and keys carried by the shaft for actuating said wedges.

5. A worm gear comprising a shaft, a split spiral thread upon the shaft, wedges for expanding said thread, keys arranged in longitudinal slots in the shaft adapted for adjusting the wedges when moved longitudinally, and a nut carried by the shaft for imparting movement to the keys.

6. A worm gear comprising a shaft, a sleeve thereon having a spiral thread portion, a second or companion spiral thread portion movable upon the sleeve, cooperable means for holding the thread portions against relative rotatable movements but adapted to allow axial movement of the second split thread portion, and means for adjusting the axial position of said second thread portion.

7. A worm gear comprising a split thread and radially movable means for expanding said thread.

JOHN P. DAMONTE.